US011711648B2

(12) United States Patent
Lopatka et al.

(10) Patent No.: US 11,711,648 B2
(45) Date of Patent: Jul. 25, 2023

(54) AUDIO-BASED DETECTION AND TRACKING OF EMERGENCY VEHICLES

(71) Applicant: Intel Corporation, Santa Clara, CA (US)

(72) Inventors: Kuba Lopatka, Gdansk (PL); Adam Kupryjanow, Gdansk (PL); Lukasz Kurylo, Gdansk (PL); Karol Duzinkiewicz, Banino (PL); Przemyslaw Maziewski, Gdansk (PL); Marek Zabkiewicz, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/814,361

(22) Filed: Mar. 10, 2020

(65) Prior Publication Data
US 2020/0213728 A1   Jul. 2, 2020

(51) Int. Cl.
*H04R 3/00* (2006.01)
*H04R 1/40* (2006.01)
(Continued)

(52) U.S. Cl.
CPC ............... *H04R 3/005* (2013.01); *G06N 3/08* (2013.01); *G10L 21/0232* (2013.01);
(Continued)

(58) Field of Classification Search
CPC .......... H04R 1/406; H04R 3/005; H04R 3/04; H04R 2410/07; G06N 3/08;
(Continued)

(56) References Cited

U.S. PATENT DOCUMENTS

| 9,972,339 B1* | 5/2018 | Sundaram ............... G10L 25/30 |
| 2008/0189100 A1* | 8/2008 | LeBlanc ............... G10L 19/005 704/207 |

(Continued)

OTHER PUBLICATIONS

European Patent Office, "Extended European Search Report," issued in connection with European Patent Application No. 20210400.6, dated May 4, 2021, 13 pages.

(Continued)

*Primary Examiner* — Daniel R Sellers
(74) *Attorney, Agent, or Firm* — Hanley, Flight & Zimmerman, LLC

(57) ABSTRACT

Techniques are provided for audio-based detection and tracking of an acoustic source. A methodology implementing the techniques according to an embodiment includes generating acoustic signal spectra from signals provided by a microphone array, and performing beamforming on the acoustic signal spectra to generate beam signal spectra, using time-frequency masks to reduce noise. The method also includes detecting, by a deep neural network (DNN) classifier, an acoustic event, associated with the acoustic source, in the beam signal spectra. The DNN is trained on acoustic features associated with the acoustic event. The method further includes performing pattern extraction, in response to the detection, to identify time-frequency bins of the acoustic signal spectra that are associated with the acoustic event, and estimating a motion direction of the source relative to the array of microphones based on Doppler frequency shift of the acoustic event calculated from the time-frequency bins of the extracted pattern.

20 Claims, 11 Drawing Sheets

(51) Int. Cl.
*G10L 25/51* (2013.01)
*G10L 25/30* (2013.01)
*H04R 3/04* (2006.01)
*G10L 21/0232* (2013.01)
*G06N 3/08* (2023.01)
*G10L 25/18* (2013.01)
*G10L 21/0216* (2013.01)

(52) U.S. Cl.
CPC ............. *G10L 25/18* (2013.01); *G10L 25/30* (2013.01); *G10L 25/51* (2013.01); *H04R 1/406* (2013.01); *H04R 3/04* (2013.01); *G10L 2021/02166* (2013.01); *H04R 2410/07* (2013.01)

(58) Field of Classification Search
CPC ..... G10L 21/0232; G10L 25/18; G10L 25/30; G10L 25/51; G10L 2021/02166
See application file for complete search history.

(56) References Cited

U.S. PATENT DOCUMENTS

| | | | | |
|---|---|---|---|---|
| 2016/0071526 | A1* | 3/2016 | Wingate | ................. G01S 3/802 704/233 |
| 2019/0027032 | A1* | 1/2019 | Arunachalam | ...... G08G 1/0965 |
| 2019/0043489 | A1 | 2/2019 | Lopatka et al. | |
| 2019/0043491 | A1 | 2/2019 | Kupryjanow et al. | |
| 2019/0049989 | A1 | 2/2019 | Akotkar et al. | |
| 2019/0104357 | A1 | 4/2019 | Atkins et al. | |
| 2019/0355251 | A1* | 11/2019 | Silver | .................. G06F 16/686 |
| 2019/0377325 | A1 | 12/2019 | Angola Abreu | |

OTHER PUBLICATIONS

Grondin et al., "Sound Event Localization and Detection Using CRNN on Pairs of Microphones," Detection and Classification of Acoustic Scenes and Events 2019, Oct. 25-26, 2019, 5 pages.

Adavanne et al., "Localization, Detection and Tracking of Multiple Moving Sound Sources with a Convolutional Recurrent Neural Network," Audio Research Group, Tampere University, Finland, Apr. 29, 2019, 5 pages.

Severdaks et al., "Vehicle Counting and Motion Direction Detection Using Microphone Array," Elektronika Ir Elektrotechnika, vol. 19, No. 8, 2013, 4 pages.

Van Den Broeck, B. et al., "Time-Domain Generalized Cross Correlation Phase Transform Sound Source Localization for Small Microphone Arrays", Conference Paper, Sep. 2012, https://researchgate.net/publication/248702037, 6 pages.

* cited by examiner

Deployment of Detection and Tracking System
100

Acoustic Source
(Emergency Vehicle Siren)
105

Autonomous Vehicle
110

Microphone
Array
120

Detection and
Tracking System
130

Autonomous
Vehicle Operation
System
140

AUDIO-BASED DETECTION AND TRACKING OF EMERGENCY VEHICLES

BACKGROUND

The detection of acoustic event sources, such as the siren of an emergency vehicle, can be important in many applications. Reliable detection of such events, however, is a difficult problem in real world environments where noise and interfering signals are present. The problem is exacerbated when the acoustic source and/or the detection platform are in motion, which is often the case.

Although the following Detailed Description will proceed with reference being made to illustrative embodiments, many alternatives, modifications, and variations thereof will be apparent in light of this disclosure.

DETAILED DESCRIPTION

Techniques are provided for detection and tracking of audio sources. As previously noted, detection and tracking of sources of acoustic events, such as the siren of an emergency vehicle, can be important in many applications. This is particularly true for the operation of an autonomous vehicle (e.g., a self-driving car), where reliable detection of such events can be critical to safe operation of the vehicle. Reliable detection, however, can be difficult in real world environments where noise, interfering signals, and reverberation are present, and where the acoustic source and/or the detection platform are in motion, which is typically the case for example, with autonomous vehicle operation.

To this end, an example embodiment of the present disclosure provides a methodology that can be used to detect and track the sources of acoustic events of interest with improved reliability. The terms detection and tracking, as used herein, refer to identification of the presence of the acoustic source along with the direction of that source and a determination of the motion of the source relative to the platform upon which the system is hosted (e.g., the autonomous vehicle). The reliability improvement is achieved through a combination of: beamforming with time-frequency mask noise reduction techniques; neural network based event detection; pattern extraction to identify time-frequency signal components related to the event of interest versus background noise; angular spectrum analysis to determine the angle of arrival; and Doppler shift frequency tracking to determine relative motion, as will be explained in greater detail below. Acoustic events of interest may include, for example, ambulance sirens, fire engine sirens, and police car sirens, although other types of non-impulsive acoustic signals may also be detected. An example system for carrying out the methodology is also provided.

Figure 1:
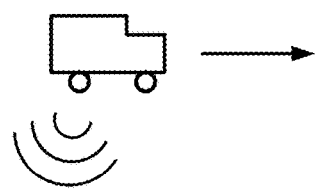
FIG. 1 is a top-level diagram of a deployment of a detection and tracking system, configured in accordance with certain embodiments of the present disclosure.
Figure 1:
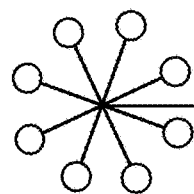

FIG. 1 is a top-level diagram of a deployment 100 of a detection and tracking system 130, configured in accordance with certain embodiments of the present disclosure. In this example use case of the detection and tracking system, an autonomous vehicle 110 is shown to include a microphone array 120, a detection and tracking system 130, and an autonomous vehicle operation system 140. The microphone array 120 is configured to receive acoustic signals that are present in the operating environment of the autonomous vehicle 110, including those from an acoustic source of interest 105, such as, for example, the siren of an emergency vehicle. Each microphone in the array 120 provides an audio channel that can be used for beamforming by the detection and tracking system 130, as will be explained in greater detail below. The detection and tracking system 130 is configured to determine an angle of arrival of acoustic events generated by the acoustic source 105, and thus, for example, the current angular direction to the emergency vehicle. The detection and tracking system 130 is also configured to determine a direction of motion of the acoustic source relative to the autonomous vehicle 110, for example, whether the emergency vehicle is approaching or receding from the autonomous vehicle. This information, angle of arrival and direction of motion, may be employed by the autonomous vehicle operation system 140 for decision-making purposes related to the safe operation of the vehicle with respect to the presence of an emergency vehicle in the vicinity of the autonomous vehicle.

The disclosed techniques can be implemented, for example, in a computing system or a software product executable or otherwise controllable by such systems, although other embodiments will be apparent. The system or product is configured to detect and track an audio source such as, for example, the siren on an emergency vehicle. In accordance with such an embodiment, a methodology to implement these techniques includes performing frequency-domain beamforming on a plurality of acoustic signal spectra to generate beam signal spectra. The acoustic signal spectra are generated from acoustic signals received from an array of microphones. The beamforming employs time-frequency masks to reduce noise in the beam signal spectra. The method also includes applying a deep neural network (DNN) classifier to detect an acoustic event, associated with the acoustic source, in at least one of the beam signal spectra. The DNN is trained on acoustic features associated with the acoustic event. The method further includes performing pattern extraction on the plurality of acoustic signal spectra in response to the detection. The pattern identifies time and frequency bins of the acoustic signal spectra that are associated with the acoustic event. The method further includes estimating a direction of motion of the acoustic source relative to the array of microphones based on a Doppler effect frequency shift of the acoustic event. The frequency shift is calculated from the time and frequency bins of the extracted pattern. The method further includes estimating a direction of the acoustic source relative to the array of microphones based on detection of a peak in an angular spectrum. The angular spectrum is generated by applying a Generalized Cross Correlation Phase Transform (GCC-PHAT) to the acoustic signal spectra.

As will be appreciated, the techniques described herein may provide improved detection and tracking of acoustic sources of interest, compared to existing techniques that simply listen for a siren frequency within an expected frequency range and/or monitor changes in volume level to determine if the source is approaching. The disclosed techniques can be implemented on a broad range of platforms including embedded systems in autonomous vehicles, workstations, laptops, tablets, and smartphones. These techniques may further be implemented in hardware or software or a combination thereof.

System Architecture

Figure 2:
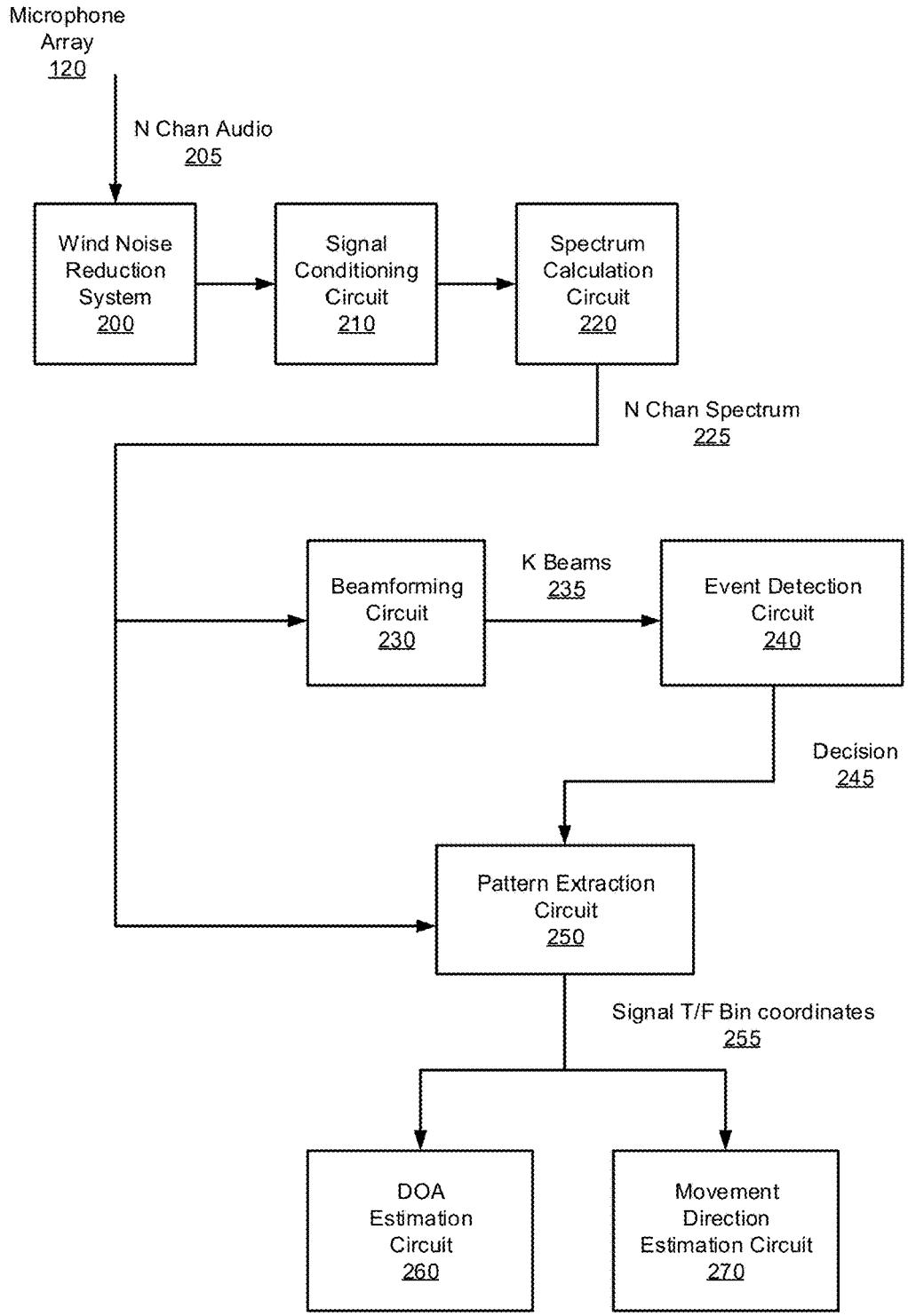
FIG. 2 is a block diagram of the detection and tracking system, configured in accordance with certain embodiments of the present disclosure.

FIG. 2 is a block diagram of the detection and tracking system 130, configured in accordance with certain embodiments of the present disclosure. The detection and tracking system 130 is shown to include the microphone array 120, a wind noise reduction system 200, a signal conditioning circuit 210, a spectrum calculation circuit 220, a beamforming circuit 230, an event detection circuit 240, a pattern extraction circuit 250, a DOA estimation circuit 260, and a movement direction estimation circuit 270. The operation of these components will be described in greater detail below, but at a high-level, frequency domain beamforming is applied to the audio channels of the microphone array to generate a number of beams steered in selected directions, from which the event detection circuit may detect the presence of an acoustic source signal of interest, such as a siren, for example. In response to the detection, the pattern extraction circuit identifies signal components that are related to the siren sound versus signal components related to background noise. Direction of arrival and movement direction of the acoustic source are then estimated from the signal components.

The microphone array 120 provides N signal channels of acoustic audio 205 which are provided to the detection and tracking system 130. Wind noise reduction system 200, which is part of the microphone array 120, is configured to reduce the negative impact of wind noise that may be present in applications where the platform is moving at relatively high speeds, such as, for example, in an automotive application. An acoustic protective mesh and "open-cell" polyurethane foam may be used to cover the microphones. These "open-cell" type foams permit air flow to an extent that the acoustic signal is not muffled but shield the microphone elements from direct impact of the wind thus reducing wind noise.

Signal conditioning circuit 120 is configured to perform any desired pre-processing operations on the audio input signal channels 205, including, for example, gain adjustments, removal of DC bias, and/or pre-emphasis (e.g., high-pass filtration). A high pass filter may be particularly useful since the frequency content of most siren signals is located above 500 Hz. As such, a high pass filter with a cutoff frequency of 300 Hz would pass the siren signals while reducing the wind noise and other sources of low-frequency interference. These signal conditioning adjustments prepare the signal for subsequent operations in the detection and tracking system and may improve the performance of the system.

Spectrum calculation circuit 220 is configured to convert the N signal channels of acoustic audio 205 from the time domain to the frequency domain. This may be accomplished with a Fast Fourier Transform or any other suitable technique in light of the present disclosure. The resulting output is N channels of signal spectrum 225 providing magnitude and phase as a function of frequency and time.

Figure 3:
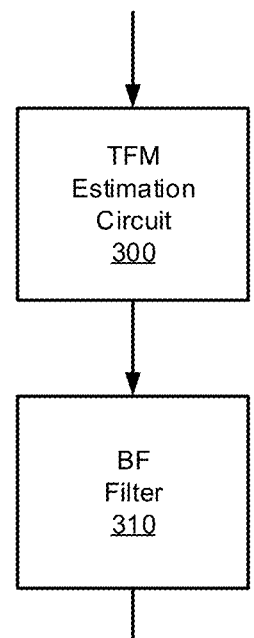
FIG. 3 is a block diagram of a beamforming circuit, configured in accordance with certain embodiments of the present disclosure.

FIG. 3 is a block diagram of the beamforming circuit 230, configured in accordance with certain embodiments of the present disclosure. Beamforming circuit 230 is shown to include a time frequency mask (TFM) estimation circuit 300 and a beamforming filter 310. Beamforming circuit 230 is configured to perform frequency domain beamforming to generate or steer beams into K selected directions based on the multi-channel spectrum input 225. For example, if K=8, the beams may correspond to the following listening directions: 0°, 45°, 90°, 135°, 180°, 225°, 270°, and 315°.

TFM estimation circuit 300 is configured to estimate the probability that noise is present in each time-frequency bin of the multi-channel spectrum input 225. In some embodiments, a recurrent neural network may be employed to estimate spectral masks for this purpose. Use of the TFM can provide improved noise reduction in the beamforming process.

Beamforming filter 310 is configured to generate steering vectors for each of the beams and apply the steering vectors to generate the beams. In some embodiments, the beamforming filter 310 may be implemented using Minimum Variance Distortionless Response (MVDR) and Generalized Eigenvalue (GEV) techniques, although other techniques may be used in light of the present disclosure. TFM can provide a benefit with any type of Beamformer that utilizes noise or signal covariance matrices for steering vector calculation, such as the MVDR. The TFM spectral masks may be employed to estimate the Cross-Power Spectral Density matrices of signal and noise components in the steering vector calculation of MVDR and GEV beamformers.

Figure 4:
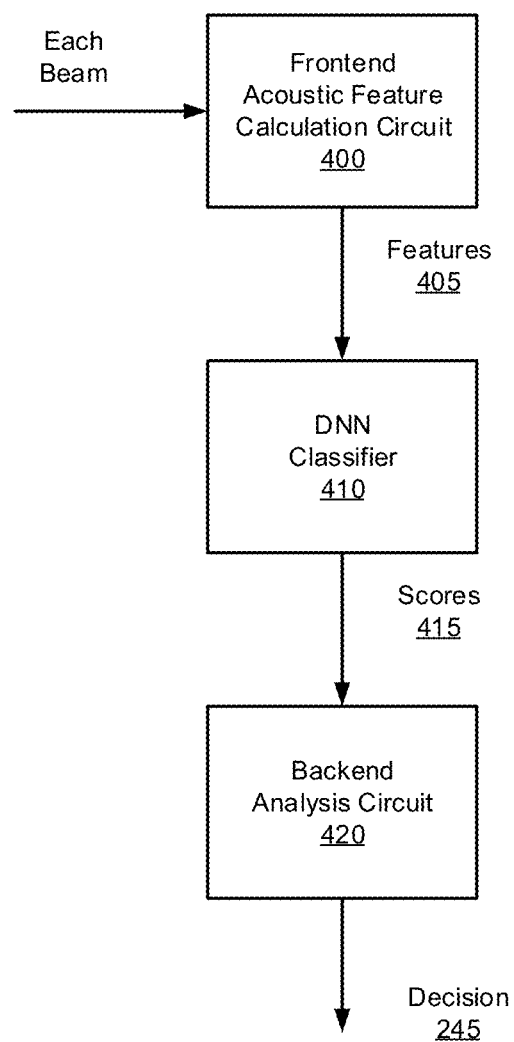
FIG. 4 is a block diagram of an event detection circuit, configured in accordance with certain embodiments of the present disclosure.

FIG. 4 is a block diagram of the event detection circuit 240, configured in accordance with certain embodiments of the present disclosure. Event detection circuit 240 is configured to detect predefined events and is shown to include a front-end acoustic feature calculation circuit 400, a DNN classifier 410, and a backend analysis circuit 420.

Front-end acoustic feature calculation circuit 400 is configured to calculate features 405 from the input data (spectrum) of each beam, which are used to detect the signal of interest (e.g., the siren sound). In some embodiments, the front-end acoustic feature calculation circuit 400 includes a non-linear filter bank, a discrete cosine transform (DCT) circuit, a logarithm circuit, and a dimensionality reduction circuit.

The non-linear filter bank is configured to distribute the power spectrum (of each beam) over non-linearly spaced frequency bins. In some embodiments, the non-linearly spaced frequency bins may conform to Mel frequency scaling, Bark frequency scaling, or other known types of frequency scaling in light of the present disclosure.

The DCT circuit is configured to perform a DCT on the frequency bins, and the logarithm circuit is configured to calculate the logarithm of the DCT transformed bins to generate Mel-Frequency Cepstral Coefficients (MFCCs) which represent the features of the continuous acoustic event. These MFCCs may be stored or stacked in a history buffer (not shown) for subsequent processing by the dimensionality reduction circuit.

To adequately describe the continuous acoustic events, such as a siren, feature vectors generally need to be calculated and buffered over a larger time span, compared to impulsive acoustic events. In some cases, for example, buffering on the order of 0.75 seconds may be appropriate. For an input signal framerate of 100 Hz, this would result in 75 frames. If all of the features were used by the classifier 410, the input layer of the DNN would require more than 1000 nodes, making the model too large and expensive to run on a platform with limited resources. For this reason, dimensionality reduction is performed to reduce the dimensionality of the stacked MFCCs to generate reduced-dimension continuous acoustic event features. According to an embodiment, an efficient method to reduce the dimensionality employs linear projection:

$$X \cdot P = \tilde{X}$$

where X is a K×M feature matrix comprising M feature vectors (the stacked MFCCs associated with M time steps or frames), each storing K features. P is an M×N projection matrix comprising M base vectors of N coefficients each (where N<M to reduce or compress the time dimension from M to N), and $\tilde{X}$ is the reduced dimension feature matrix comprising feature vectors of length K at N compressed time steps. The projection operation is illustrated by the following matrix multiplication:

$$\begin{bmatrix} -x_1- \\ -x_2- \\ \cdots \\ -x_K- \end{bmatrix}_{K \times M} \cdot \begin{bmatrix} | & | & & | \\ p_1 & p_2 & \cdots & p_N \\ | & | & & | \end{bmatrix}_{M \times N} = \begin{bmatrix} -\tilde{x}_1- \\ -\tilde{x}_2- \\ \cdots \\ -\tilde{x}_K- \end{bmatrix}_{K \times N}$$

Application of another DCT, for the dimensionality reduction projection matrix, is found to be particularly efficient. Thus, in some embodiments, the base vectors of the projection matrix are cosine kernel functions:

$$P(m, n) = \cos\left[\frac{\pi}{M}\left(n + \frac{1}{2}\right)m\right]$$

Thus, for example, If M=75 and K=23, the feature matrix X before dimensionality reduction has 1725 elements. By retaining only N=8 DCT coefficients (i.e., calculating P for m=1 to 75 and for n=1 to 8), the compressed feature matrix X is reduced to only 184 elements, which allows for a smaller and more efficient DNN implementation.

Figure 5:
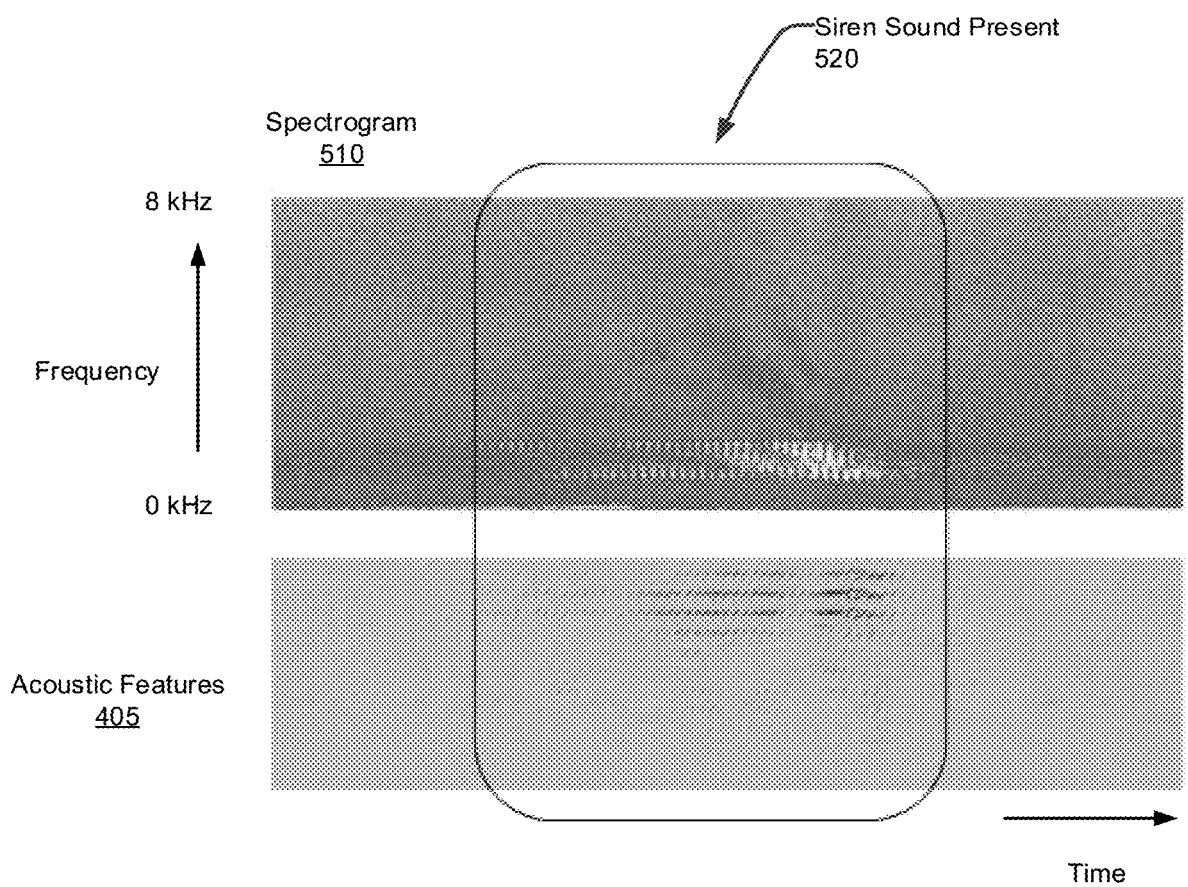
FIG. 5 illustrates a spectrogram and associated acoustic features, in accordance with certain embodiments of the present disclosure.

FIG. 5 illustrates an example spectrogram 510 from one beam, and the associated acoustic features 405, in accordance with certain embodiments of the present disclosure. The region in which the siren sound is present is indicated by the block 520. The features tend to be sensitive to the specific shape of the signal of interest and are generally good at discerning between the siren sound, for example, and other interfering sounds and background noise, even in low signal-to-noise ratio environments.

DNN classifier 410 is trained to generate scores 415, that indicate that posterior probability of observing selected classes of sounds. Scores are generated for each of the features associated with the signal of interest, interfering sounds, and background noise. The DNN classifier 410 may be trained using any suitable method, in light of the present disclosure. The DNN classifier 410 is trained on example target sounds (emergency vehicle sirens) and non-target sounds. The non-target sounds represent typical sounds which can be encountered by the system in a real-world environment, and may include traffic noises, engine noises, impulsive events, human and animal sounds, etc. The selection of training sounds should include sounds which are likely to be confused with the target sound to increase the robustness of the system. Such sounds may include, for example, smoke alarms, burglar alarms, beeps, musical instruments, bird sounds, etc. The training sounds may be augmented with noise and reverberation so that the classifier is capable of operating under challenging conditions in an urban environment. In some embodiments, the DNN classifier circuit 410 is configured as a deep feedforward neural network comprising a number of fully connected affine layers. In some embodiments, the number of layers may be in the range of 4 to 6 layers. Other topologies are also possible, including convolution and recurrent layers.

Backend analysis circuit 420 is configured to analyze the DNN output scores 415 and provide a decision 245 on the presence or absence of the signal of interest in a particular frame or frames of that beam. In some embodiments, the backend analysis circuit 420 is configured to smooth the DNN classifier outputs (scores 415) over time and determine at which point an event is detected based on a comparison of the score to a threshold value.

Figure 6:
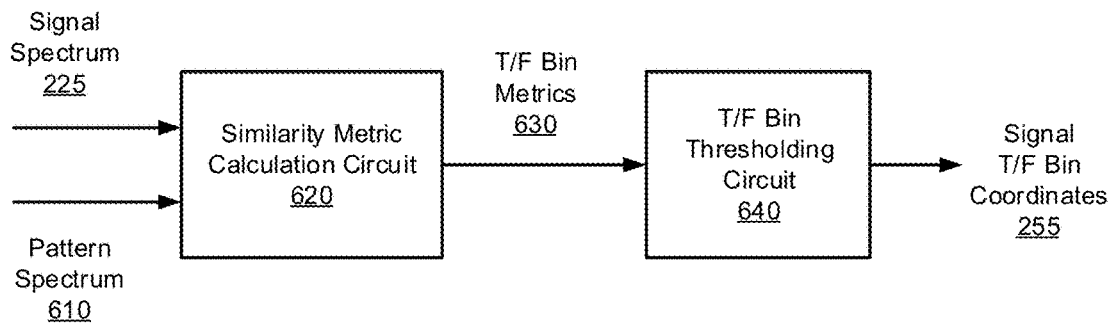
FIG. 6 is a block diagram of pattern extraction circuits, configured in accordance with certain embodiments of the present disclosure.
Figure 6:
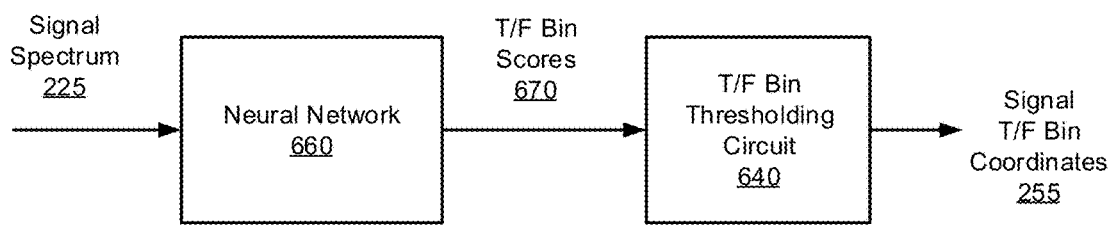

FIG. 6 is a block diagram of pattern extraction circuits 250a and 250b, configured in accordance with certain embodiments of the present disclosure. After the presence of the signal of interest is detected (decision 245) in the audio signal, pattern extraction is employed to determine a more precise location in time and frequency of the signal of interest.

Pattern extraction circuit 250a is configured to perform pattern dependent extraction (e.g., where the expected pattern is known), and is shown to include similarity metric calculation circuit 620 and time-frequency bin thresholding circuit 640.

Similarity metric calculation circuit 620 is configured to compare the signal spectrum 225 (for each microphone channel) with a predetermined spectrum of the expected pattern (e.g., a siren). A similarity metric 630 is calculated for each time-frequency bin using any suitable technique in light of the present disclosure. Time-frequency bin thresholding circuit 640 is configured to attenuate time-frequency bins for which the similarity metric 630 is less than a selected threshold value, as these bins are likely not associated with the pattern of the signal of interest.

Pattern extraction circuit 250b is configured to perform pattern independent extraction and is shown to include a neural network 660 and time-frequency bin thresholding circuit 640.

Neural network 660 is trained to model low-level characteristics of the signal of interest (e.g., siren sounds) and assign a score 670 to each time-frequency bin indicating a likelihood that the signal of interest is present in that bin. Neural network 660 may be trained using any suitable training techniques in light of the present disclosure. As with pattern extraction circuit 250a, the time-frequency bin thresholding circuit 640 will attenuate time-frequency bins for which the score 670 is less than a selected threshold value, as these bins are likely not associated with the pattern of the signal of interest.

Both pattern extraction circuits 250a and 250b generate signal time-frequency bin coordinates 255, which provide the estimated start point and end point of the signal of interest along with the time and frequency coordinates of the signal components which constitute the signal of interest (e.g., siren sound) for use by the DOA estimation circuit 260 and the movement direction estimation circuit 270.

The combination of event detection and pattern extraction can be regarded as a two-stage process in which the acoustic event detection has a high sensitivity to siren sounds, for example, and the pattern extraction circuit verifies with greater certainty that the siren sound is present. Because the neural network 660 operates with a priori knowledge that the siren sound is present (based on the prior event detection) it provides a more precise detection. This two-stage approach offers advantages in that (1) the relatively complex pattern extraction process does not need to be executed continuously, but rather in response to a detection which enables power savings, and (2) the cascade of two stages reduces the false detection rate.

Figure 7:
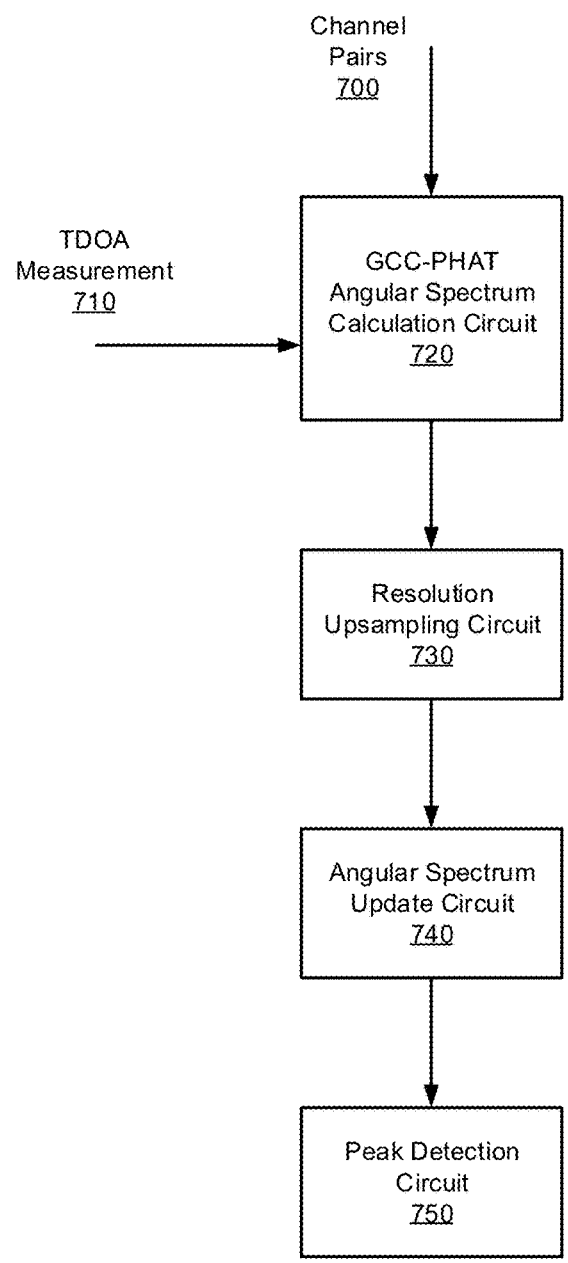
FIG. 7 is a block diagram of a direction of arrival (DOA) estimation circuit, configured in accordance with certain embodiments of the present disclosure.

FIG. 7 is a block diagram of the DOA estimation circuit 260, configured in accordance with certain embodiments of the present disclosure. DOA estimation circuit 260 is shown to include a Generalized Cross Correlation Phase Transform (GCC-PHAT) angular spectrum calculation circuit 720, a resolution up-sampling circuit 730, an angular spectrum update circuit 740, and a peak detection circuit 750.

Figure 8:
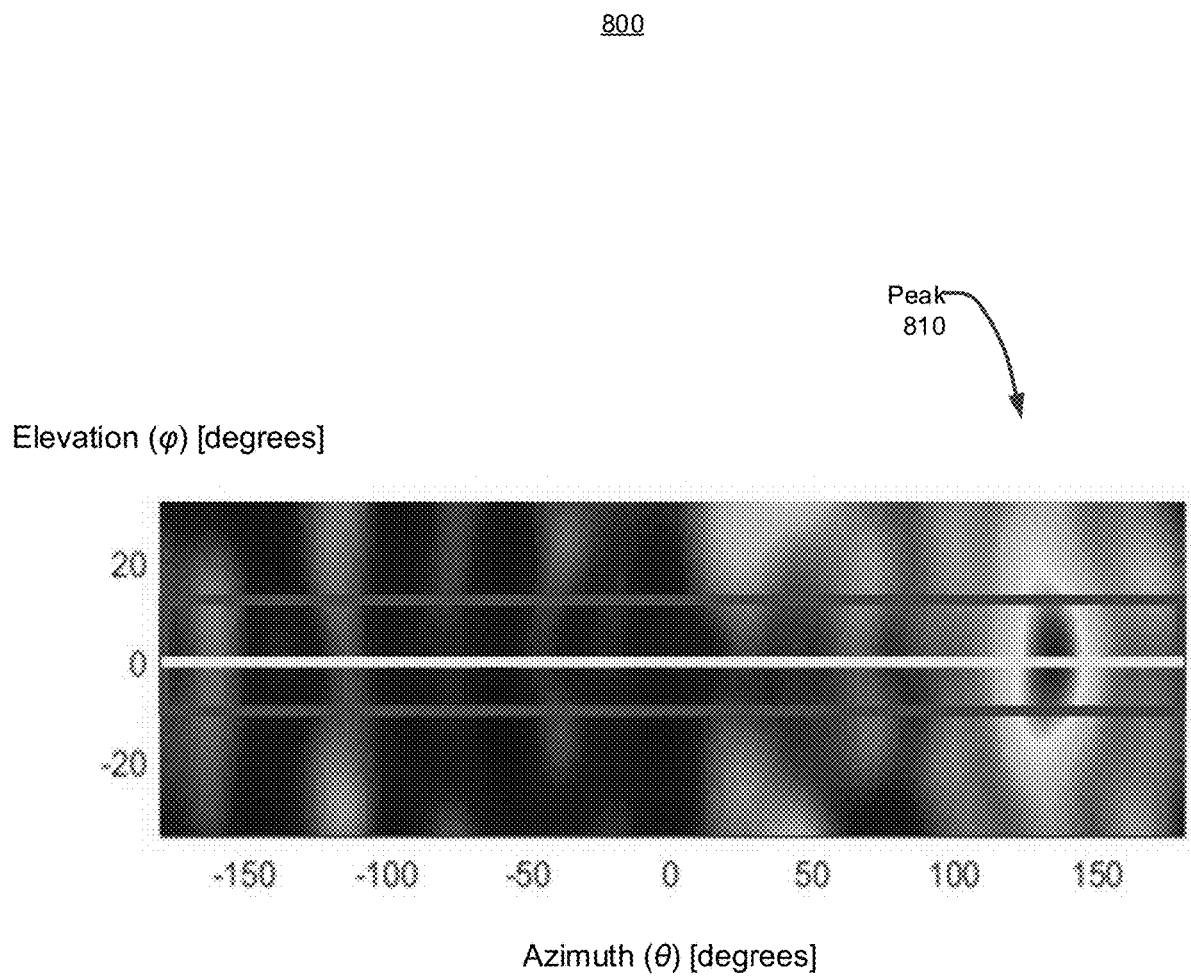
FIG. 8 illustrates an angular spectrum, in accordance with certain embodiments of the present disclosure.

GCC-PHAT angular spectrum calculation circuit 720 is configured to calculate an angular spectrum 800, an example of which is illustrated in FIG. 8. The peak of the spectrum 810 indicates the direction of arrival of the signal of interest in terms of azimuth angle θ and elevation angle φ, relative to the microphone array.

The angular spectrum $\Phi[l,\theta,\varphi]$ is calculated in the frequency domain for each lth frame of the acoustic signal spectrum (e.g., FFT frame) using the process described as follows. Given that there are a total number of pairs N, of microphones in the microphone array, then for each signal frame l, $\Phi_n[l,\theta,\varphi]$ is computed for the microphone pair with index n, where n ranges from 0 to N−1.

The GCC-PHAT for the nth microphone pair at the lth signal frame is calculated as:

$$GCC_n^{PHAT}[l,k] = \frac{X_i[l,k] \cdot X_j[l,k]^*}{|X_i[l,k] \cdot X_j[l,k]^*|}$$

where i and j are the indexes of microphones in the nth pair and $X_i[l,k]$ is the input signal complex spectrum for frame l and frequency bin k. The angular spectrum for the nth pair of microphones at the lth signal frame is calculated as the sum of GCC-PHAT over all frequency bins k for each selected azimuth and elevation angles as:

$$\Phi_n[l,\theta,\varphi] = \sum_k GCC_n^{PHAT}[l,k] \cdot e^{(-j \cdot 2 \cdot \Pi \cdot f[k] \cdot \tau_n[\theta,\varphi])}$$

where f is the frequency in Hz calculated as:

$$f[k] = k \cdot \left(\frac{f_s}{NFFT}\right),$$

$f_s$ is the sample rate, NFFT is the FFT length, and $\tau_n[\theta,\varphi]$ is time delay of signal arrival (TDOA) for direction $\{\theta,\varphi\}$. The TDOA is calculated for the center point of microphone array (e.g., the centroid of the array geometry). The angular spectrum is thus calculated as the sum of the angular spectrum for each of the N microphone pairs:

$$\Phi[l,\theta,\varphi] = \sum_{n=0}^{N-1} \Phi_n[l,\theta,\varphi]$$

Due to the computational complexity of calculating $\Phi_n[l,\theta,\varphi]$ for each azimuth and elevation angle, in some embodiments $\Phi_n[l,\theta,\varphi]$ may be calculated with a smaller resolution than 1°, such as, for example 5° or more. Resolution up-sampling circuit 730 is configured to up-sample $\Phi_n[l,\theta,\varphi]$ using quadratic interpolation to obtain a resolution of 1° to generate an interpolated angular spectrum.

Angular spectrum update circuit 740 is configured to update the angular spectrum for each new FFT frame according to the following formula:

$$\Phi[l,\theta,\varphi] = \alpha \cdot \Phi[l-1,\theta,\varphi] + (1-\alpha) \cdot \sum_{n=0}^{N-1} \Phi_n[l,\theta,\varphi]$$

where α is a decay parameter that is selected to control the relative influence of calculations from prior frames on the calculation from the current frame.

Peak detection circuit 750 is configured to detect the peak 810 in the angular spectrum which indicates the estimate of the direction of arrival (in azimuth and elevation) of the signal of interest.

Figure 9:
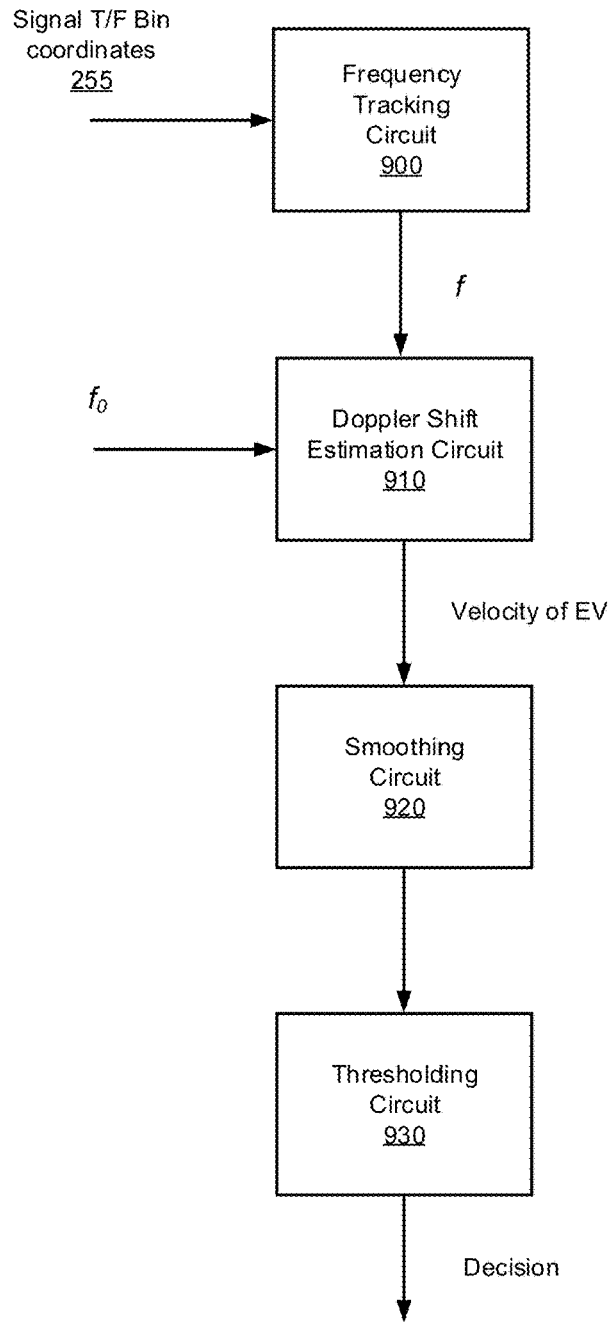
FIG. 9 is a block diagram of a movement direction estimation circuit, configured in accordance with certain embodiments of the present disclosure.

FIG. 9 is a block diagram of the movement direction estimation circuit 270, configured in accordance with certain embodiments of the present disclosure. Movement direction estimation circuit 270 is shown to include a frequency tracking circuit 900, a Doppler shift estimation circuit 910, a smoothing circuit 920, and a thresholding circuit 930.

Frequency tracking circuit 900 is configured to track the frequency f of the signal of interest (e.g., the siren) over time based on the location of the time-frequency components 255 of the siren that are provided by the pattern extraction circuit 250.

Doppler shift estimation circuit 910 is configured to calculate the direction of movement of the source of the signal of interest (e.g., the emergency vehicle), based on the Doppler shift of the frequency of the siren. This may be calculated according to:

$$f = \left(\frac{c + V_{autonomous}}{c + V_{EV}}\right) \cdot f_0$$

where f is the frequency of the siren as provided by frequency tracking circuit 900, $f_0$ is the known or expected frequency of the siren, c is the speed of sound, $V_{EV}$ is the velocity of the emergency vehicle, and $V_{autonomous}$ is the velocity of the autonomous vehicle 110 on which the microphone array 120 and detection and tracking system 130 are hosted (which is a known of measurable quantity). A positive $V_{EV}$ indicates that the emergency vehicles approaching while a negative $V_{EV}$ indicates that the emergency vehicle is receding, relative to the autonomous vehicle.

In some embodiments, smoothing circuit 920 is configured to smooth the estimated $V_{EV}$ over time to reduce the influence of random short-term errors that may occur in the estimation process. In some embodiments, thresholding circuit 930 is configured to compare the estimated $V_{EV}$ to a threshold value to generate a decision related to the operation of the autonomous vehicle 110. For example, if the emergency vehicle is approaching the autonomous vehicle and the velocity of the emergency vehicle is determined to exceed a threshold value, a decision may be made to pull over and stop the autonomous vehicle or to take some other safety-related action. In some embodiments, the estimated direction of arrival may also be employed, in any suitable manner, in the decision-making process for the operation of the autonomous vehicle.

Methodology

Figure 10:
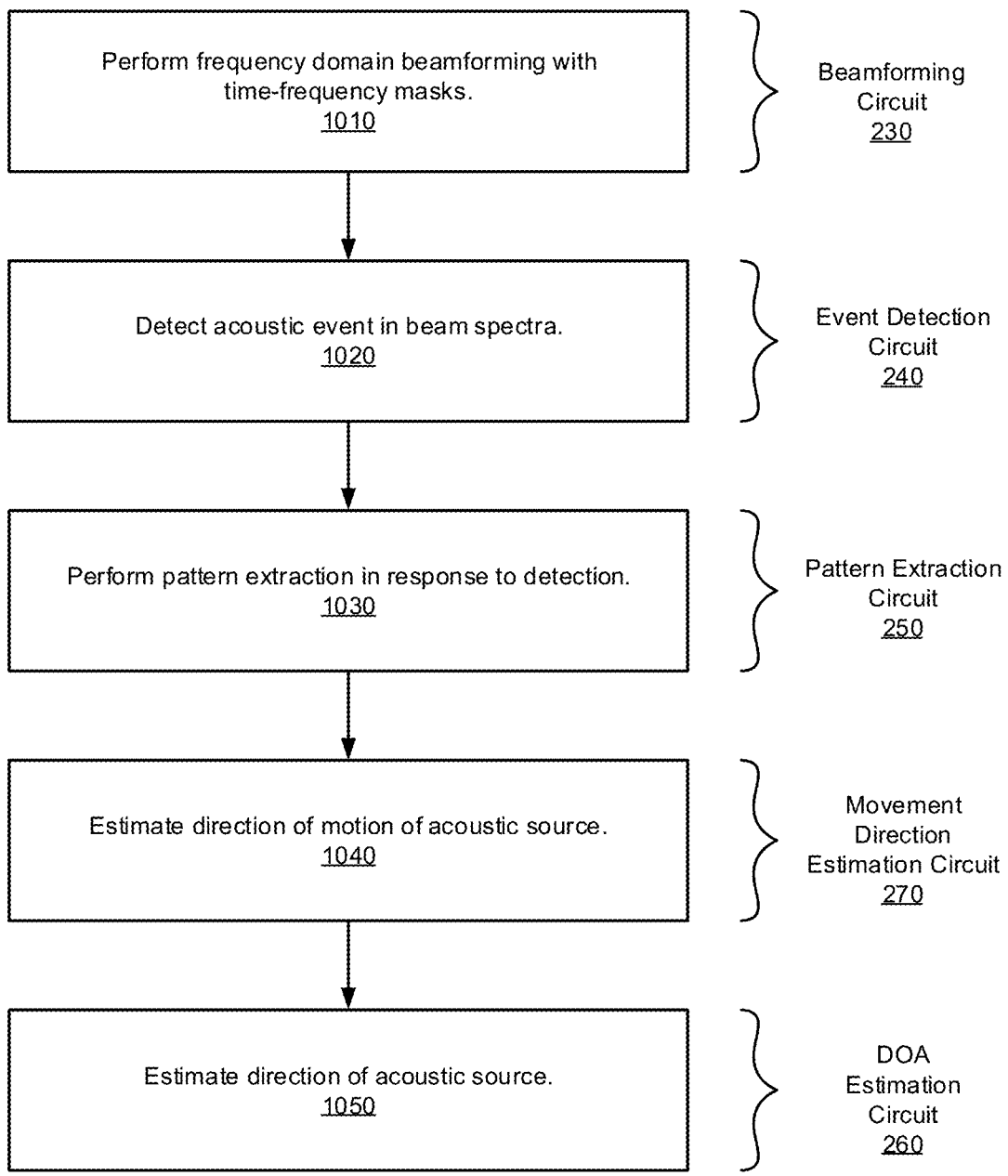
FIG. 10 is a flowchart illustrating a methodology for detection and tracking of an acoustic source, in accordance with certain embodiments of the present disclosure.

FIG. 10 is a flowchart illustrating a methodology 1000 for detection and tracking of an acoustic source, in accordance with certain embodiments of the present disclosure. As can be seen, the example method includes a number of phases and sub-processes, the sequence of which may vary from one embodiment to another. However, when considered in the aggregate, these phases and sub-processes form a process for acoustic detection and tracking, in accordance with certain of the embodiments disclosed herein. These embodiments can be implemented, for example, using the system architecture illustrated in FIGS. 1-4, 6, 7, and 9, as described above. However other system architectures can be used in other embodiments, as will be apparent in light of this disclosure. To this end, the correlation of the various functions shown in FIG. 10 to the specific components illustrated in the other figures is not intended to imply any structural and/or use limitations. Rather, other embodiments may include, for example, varying degrees of integration wherein multiple functionalities are effectively performed by one system. For example, in an alternative embodiment a single module having decoupled sub-modules can be used to perform all of the functions of method 1000. Thus, other embodiments may have fewer or more modules and/or sub-modules depending on the granularity of implementation. In still other embodiments, the methodology depicted can be implemented as a computer program product including one or more non-transitory machine-readable mediums that when executed by one or more processors cause the methodology to be carried out. Numerous variations and alternative configurations will be apparent in light of this disclosure.

As illustrated in FIG. 10, in an embodiment, method 1000 for detection and tracking of an acoustic source commences by performing, at operation 1010, frequency-domain beamforming on a plurality of acoustic signal spectra to generate a first beam signal spectrum and a second beam signal spectrum. The acoustic signal spectra are generated from acoustic signals received from an array of microphones. The beamforming employs time-frequency masks to reduce noise in the first beam signal spectrum and the second beam signal spectrum.

Next, at operation 1020, a DNN classifier is employed to detect an acoustic event, associated with the acoustic source, in at least one of the first beam signal spectrum and the second beam signal spectrum. The DNN is trained on acoustic features associated with the acoustic event. In some embodiments, the acoustic source is an emergency vehicle and the acoustic event is a siren.

At operation 1030, pattern extraction is performed on the plurality of acoustic signal spectra in response to the detection. The pattern comprises identified time and frequency bins of the acoustic signal spectra that are associated with the acoustic event.

At operation 1040, a direction of motion of the acoustic source relative to the array of microphones is estimated. The estimation is based on a Doppler effect frequency shift of the acoustic event, the Doppler effect frequency shift calculated from the time and frequency bins of the extracted pattern.

At operation 1050, a direction of the acoustic source relative to the array of microphones is estimated based on detection of a peak in an angular spectrum. In some embodiments, the angular spectrum is generated by applying a GCC-PHAT to the acoustic signal spectra.

Of course, in some embodiments, additional operations may be performed, as previously described in connection with the system. For example, a high-pass filter may be applied to the acoustic signals to reduce wind noise. In some embodiments, the estimated direction of motion and/or the estimated direction of the acoustic source may be employed in the operation of an autonomous vehicle.

Example System

Figure 11:
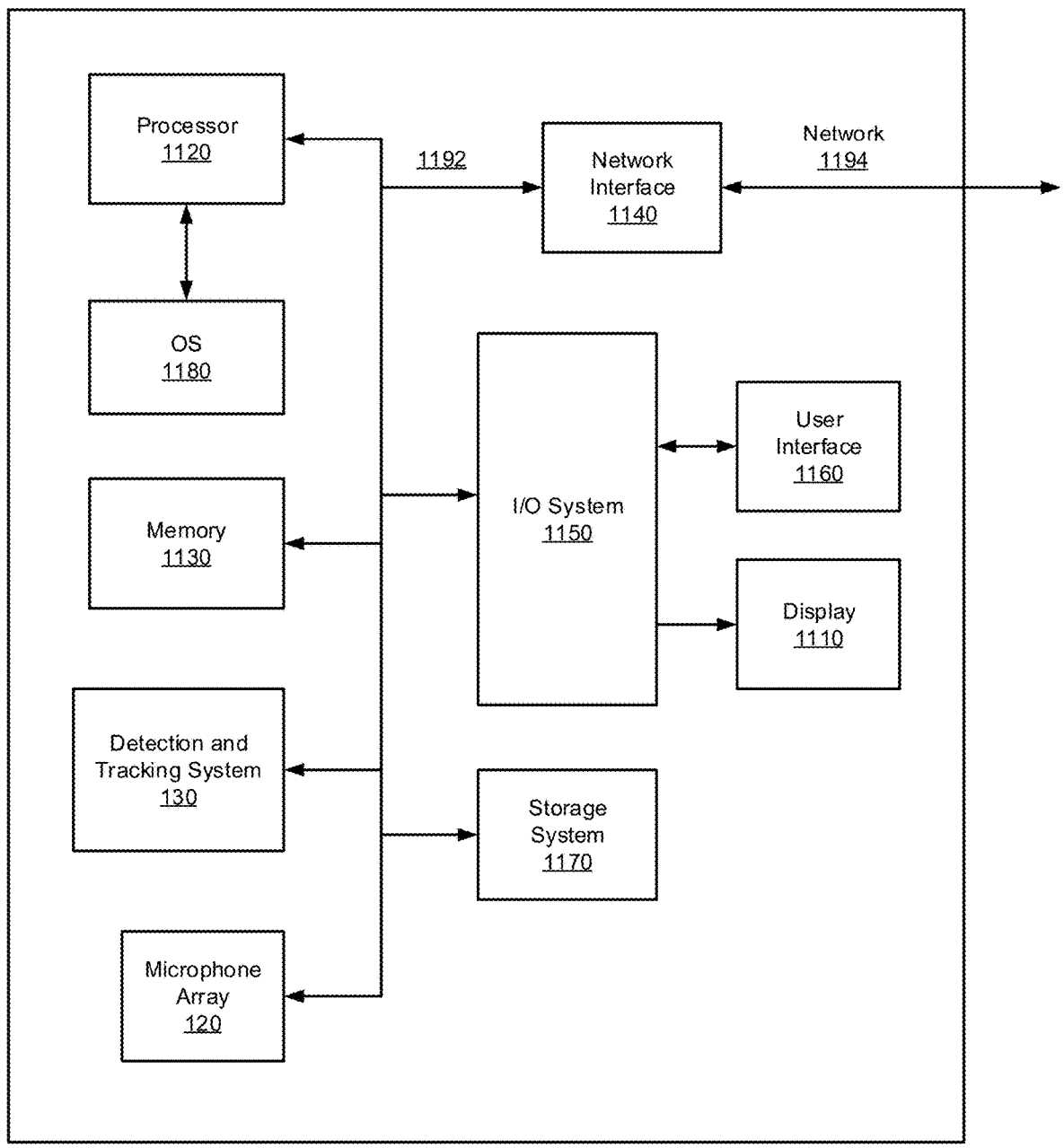
FIG. 11 is a block diagram schematically illustrating a computing platform configured to perform detection and tracking of an acoustic source, in accordance with certain embodiments of the present disclosure.

FIG. 11 is a block diagram schematically illustrating an example computing platform 1100 configured to perform detection and tracking of an acoustic source, in accordance with certain embodiments of the present disclosure. In some embodiments, platform 1100 may be hosted on, or otherwise be incorporated into a personal computer, workstation, server system, laptop computer, ultra-laptop computer, tablet, touchpad, portable computer, handheld computer, palmtop computer, personal digital assistant (PDA), cellular telephone, combination cellular telephone and PDA, smart device (for example, smartphone, smart-speaker, or smart-tablet), mobile internet device (MID), messaging device, data communication device, wearable device, embedded system, and so forth. Any combination of different devices may be used in certain embodiments. In some embodiments, the computing platform 1100 may be hosted on an autonomous vehicle, so that the detection and tracking system 130 can assist in the safe operation of the autonomous vehicle, as previously described.

In some embodiments, platform 1100 may comprise any combination of a processor 1120, a memory 1130, a detection and tracking system 130, a microphone array 120, a network interface 1140, an input/output (I/O) system 1150, a user interface 1160, a display 1110, and a storage system 1170. As can be further seen, a bus and/or interconnect 1192 is also provided to allow for communication between the various components listed above and/or other components not shown. Platform 1100 can be coupled to a network 1194 through network interface 1140 to allow for communications with other computing devices, platforms, devices to be controlled, or other resources. Other componentry and functionality not reflected in the block diagram of FIG. 11 will be apparent in light of this disclosure, and it will be appreciated that other embodiments are not limited to any particular hardware configuration.

Processor 1120 can be any suitable processor, and may include one or more coprocessors or controllers, such as an audio processor, a graphics processing unit, or hardware accelerator, to assist in control and processing operations associated with platform 1100. In some embodiments, the processor 1120 may be implemented as any number of processor cores. The processor (or processor cores) may be any type of processor, such as, for example, a microprocessor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 1120 may be implemented as a complex instruction set computer (CISC) or a reduced instruction set computer (RISC) processor. In some embodiments, processor 1120 may be configured as an x86 instruction set compatible processor.

Memory 1130 can be implemented using any suitable type of digital storage including, for example, flash memory and/or random-access memory (RAM). In some embodiments, the memory 1130 may include various layers of memory hierarchy and/or memory caches as are known to those of skill in the art. Memory 1130 may be implemented as a volatile memory device such as, but not limited to, a RAM, dynamic RAM (DRAM), or static RAM (SRAM) device. Storage system 1170 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 1170 may comprise technology to increase the storage performance enhanced protection for valuable digital media when multiple hard drives are included.

Processor 1120 may be configured to execute an Operating System (OS) 1180 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with platform 1100, and therefore may also be implemented using any suitable existing or subsequently-developed platform.

Network interface circuit 1140 can be any appropriate network chip or chipset which allows for wired and/or wireless connection between other components of platform 1100 and/or network 1194, thereby enabling platform 1100 to communicate with other local and/or remote computing systems, servers, cloud-based servers, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1150 may be configured to interface between various I/O devices and other components of platform 1100. I/O devices may include, but not be limited to, user interface 1160, display 1110. Display 1110 may be configured to display the detection and tracking results, for example, in a map format. User interface 1160 may include devices (not shown) such as a microphone, touchpad, keyboard, and mouse, etc. I/O system 1150 may include a graphics subsystem configured to perform processing of images for rendering on the display element. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1120 or any chipset of platform 1100.

It will be appreciated that in some embodiments, the various components of platform 1100 may be combined or integrated in a system-on-a-chip (SoC) architecture. In some embodiments, the components may be hardware components, firmware components, software components or any suitable combination of hardware, firmware or software.

Detection and tracking system 130 is configured to detect an acoustic source of interest (e.g., an emergency vehicle siren), and estimate the angular direction to the source as well as the motion of the source relative to the platform, as described previously. Detection and tracking system 130 may include any or all of the circuits/components illustrated in FIGS. 1-4, 6, 7, and 9, as described above. These components can be implemented or otherwise used in conjunction with a variety of suitable software and/or hardware that is coupled to or that otherwise forms a part of platform 1100. These components can additionally or alternatively be implemented or otherwise used in conjunction with user I/O devices that are capable of providing information to, and receiving information and commands from, a user.

In some embodiments, these circuits may be installed local to platform 1100, as shown in the example embodiment of FIG. 11. Alternatively, platform 1100 can be implemented in a client-server arrangement wherein at least some functionality associated with these circuits is provided to platform 1100 using an applet, such as a JavaScript applet, or other downloadable module or set of sub-modules. Such remotely accessible modules or sub-modules can be provisioned in real-time, in response to a request from a client computing system for access to a given server having resources that are of interest to the user of the client computing system. In such embodiments, the server can be local to network 1194 or remotely coupled to network 1194 by one or more other networks and/or communication channels. In some cases, access to resources on a given network or computing system may require credentials such as usernames, passwords, and/or compliance with any other suitable security mechanism.

In various embodiments, platform 1100 may be implemented as a wireless system, a wired system, or a combination of both. When implemented as a wireless system, platform 1100 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1100 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1194. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1100 may comprise additional, fewer, or alternative subcomponents as compared to those included in the example embodiment of FIG. 11.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

FURTHER EXAMPLE EMBODIMENTS

The following examples pertain to further embodiments, from which numerous permutations and configurations will be apparent.

Example 1 is a processor-implemented method for audio-based detection and tracking of an acoustic source, the method comprising: performing, by a processor-based system, beamforming on a plurality of acoustic signal spectra to generate a first beam signal spectrum and a second beam signal spectrum, the acoustic signal spectra generated from acoustic signals received from an array of microphones; detecting, by a deep neural network (DNN) classifier, an acoustic event associated with the acoustic source, in at least one of the first beam signal spectrum and the second beam signal spectrum; performing, by the processor-based system, pattern extraction in response to the detection, the pattern comprising identified time and frequency bins of the plurality of acoustic signal spectra, the bins associated with the acoustic event; and estimating, by the processor-based system, a direction of motion of the acoustic source relative to the array of microphones, the estimation based on a Doppler frequency shift of the acoustic event, the Doppler frequency shift calculated from the time and frequency bins of the extracted pattern.

Example 2 includes the subject matter of Example 1, further comprising: applying a Generalized Cross Correlation Phase Transform to the plurality of acoustic signal spectra to generate an angular spectrum; and estimating a direction of the acoustic source relative to the array of microphones based on detection of a peak in the angular spectrum.

Example 3 includes the subject matter of Examples 1 or 2, further comprising employing at least one of the estimated direction of motion and the estimated direction of the acoustic source for operation of an autonomous vehicle.

Example 4 includes the subject matter of any of Examples 1-3, wherein the pattern extraction comprises comparing one or more of the plurality of acoustic signal spectra to a predetermined spectrum associated with the expected pattern, and identifying time and frequency bins that match, based on the comparison, to within a threshold value.

Example 5 includes the subject matter of any of Examples 1-4, wherein the pattern extraction comprises applying a neural network to one or more of the plurality of acoustic signal spectra, the neural network trained to generate scores for time and frequency bins of the acoustic signal spectra that indicate a probability of matching to an acoustic event of interest.

Example 6 includes the subject matter of any of Examples 1-5, wherein the acoustic source is an emergency vehicle and the acoustic event is a siren.

Example 7 includes the subject matter of any of Examples 1-6, further comprising applying a high-pass filter to the acoustic signals to reduce wind noise.

Example 8 is at least one non-transitory computer readable storage medium having instructions encoded thereon that, when executed by one or more processors, cause a process to be carried out for audio-based detection and tracking of an acoustic source, the process comprising: performing beamforming on a plurality of acoustic signal spectra to generate a first beam signal spectrum and a second beam signal spectrum, the acoustic signal spectra generated from acoustic signals received from an array of microphones; detecting, by a deep neural network (DNN) classifier, an acoustic event associated with the acoustic source, in at least one of the first beam signal spectrum and the second beam signal spectrum; performing pattern extraction in response to the detection, the pattern comprising identified time and frequency bins of the plurality of acoustic signal spectra, the bins associated with the acoustic event; and estimating a direction of motion of the acoustic source relative to the array of microphones, the estimation based on a Doppler frequency shift of the acoustic event, the Doppler frequency shift calculated from the time and frequency bins of the extracted pattern.

Example 9 includes the subject matter of Example 8, wherein the process further comprises: applying a Generalized Cross Correlation Phase Transform to the plurality of acoustic signal spectra to generate an angular spectrum; and estimating a direction of the acoustic source relative to the array of microphones based on detection of a peak in the angular spectrum.

Example 10 includes the subject matter of Examples 8 or 9, wherein the process further comprises employing at least one of the estimated direction of motion and the estimated direction of the acoustic source for operation of an autonomous vehicle.

Example 11 includes the subject matter of any of Examples 8-10, wherein the pattern extraction process comprises comparing one or more of the plurality of acoustic signal spectra to a predetermined spectrum associated with the expected pattern, and identifying time and frequency bins that match, based on the comparison, to within a threshold value.

Example 12 includes the subject matter of any of Examples 8-11, wherein the pattern extraction process comprises applying a neural network to one or more of the plurality of acoustic signal spectra, the neural network trained to generate scores for time and frequency bins of the acoustic signal spectra that indicate a probability of matching to an acoustic event of interest.

Example 13 includes the subject matter of any of Examples 8-12, wherein the acoustic source is an emergency vehicle and the acoustic event is a siren.

Example 14 includes the subject matter of any of Examples 8-13, wherein the process further comprises applying a high-pass filter to the acoustic signals to reduce wind noise.

Example 15 is a system for audio-based detection and tracking of an acoustic source, the system comprising: a beamforming circuit to perform beamforming on a plurality of acoustic signal spectra to generate a first beam signal spectrum and a second beam signal spectrum, the acoustic signal spectra generated from acoustic signals received from an array of microphones; a deep neural network (DNN) classifier to detect an acoustic event associated with the acoustic source, in at least one of the first beam signal spectrum and the second beam signal spectrum; a pattern extraction circuit to perform pattern extraction in response to the detection, the pattern comprising identified time and frequency bins of the plurality of acoustic signal spectra, the bins associated with the acoustic event; and a movement direction estimation circuit to estimate a direction of motion of the acoustic source relative to the array of microphones, the estimation based on a Doppler frequency shift of the acoustic event, the Doppler frequency shift calculated from the time and frequency bins of the extracted pattern.

Example 16 includes the subject matter of Example 15, further comprising a direction of arrival estimation circuit to apply a Generalized Cross Correlation Phase Transform to the plurality of acoustic signal spectra to generate an angular spectrum; and estimate a direction of the acoustic source relative to the array of microphones based on detection of a peak in the angular spectrum.

Example 17 includes the subject matter of Examples 15 or 16, wherein at least one of the estimated direction of motion and the estimated direction of the acoustic source is employed for operation of an autonomous vehicle.

Example 18 includes the subject matter of any of Examples 15-17, wherein the pattern extraction circuit is further to compare one or more of the plurality of acoustic signal spectra to a predetermined spectrum associated with the expected pattern, and identify time and frequency bins that match, based on the comparison, to within a threshold value.

Example 19 includes the subject matter of any of Examples 15-18, wherein the pattern extraction circuit further comprises a neural network for application to one or more of the plurality of acoustic signal spectra, the neural network trained to generate scores for time and frequency bins of the acoustic signal spectra that indicate a probability of matching to an acoustic event of interest.

Example 20 includes the subject matter of any of Examples 15-19, wherein the acoustic source is an emergency vehicle and the acoustic event is a siren.

Example 21 includes the subject matter of any of Examples 15-20, further comprising a signal conditioning circuit to apply a high-pass filter to the acoustic signals to reduce wind noise.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for audio-based detection and tracking of an acoustic source, the method comprising:
   performing, by a processor-based system, beamforming on a plurality of acoustic signal spectra to generate at least a first beam signal spectrum in a first direction and a second beam signal spectrum in a second direction different from the first direction, the acoustic signal spectra generated from acoustic signals received from an array of microphones;
   detecting, by the processor-based system, using a deep neural network (DNN) classifier, an acoustic event associated with the acoustic source in at least one of the first beam signal spectrum or the second beam signal spectrum;
   estimating, by the processor-based system, using the deep neural network (DNN) classifier, a direction of the acoustic source of at least one of the first direction or the second direction;
   performing, by the processor-based system:
      first pattern extraction instructions in response to the detection of the acoustic event, the first pattern extraction instructions associated with a first power state of the processor-based system; and
      second pattern extraction instructions prior to the detection of the acoustic event, the second pattern extraction instructions associated with a second power state of the processor-based system, the second power state consuming less power than the first power state, the pattern comprising identified time and frequency bins of the plurality of acoustic signal spectra, the bins associated with the acoustic event; and
   estimating, by the processor-based system, a direction of motion of the acoustic source relative to the array of microphones, the estimation based on a Doppler frequency shift of the acoustic event, the Doppler frequency shift calculated from the time and frequency bins of the extracted pattern.

2. The method of claim 1, further comprising:
applying a Generalized Cross Correlation Phase Transform to the plurality of acoustic signal spectra to generate an angular spectrum; and
estimating the direction of the acoustic source relative to the array of microphones based on detection of a peak in the angular spectrum.

3. The method of claim 1, wherein the pattern extraction comprises comparing one or more of the plurality of acoustic signal spectra to a predetermined spectrum associated with an expected pattern, and identifying time and frequency bins that match, based on the comparison, to within a threshold value.

4. The method of claim 1, wherein the pattern extraction comprises applying a neural network to one or more of the plurality of acoustic signal spectra, the neural network trained to generate scores for time and frequency bins of the acoustic signal spectra that indicate a probability of matching to an acoustic event of interest.

5. The method of claim 1, wherein the acoustic source is an emergency vehicle and the acoustic event is a siren.

6. The method of claim 1, further comprising applying a high-pass filter to the acoustic signal spectra to reduce wind noise.

7. The method of claim 1, further including calculating the Doppler frequency shift based on the time and frequency bins of the extracted pattern, a known frequency of the acoustic event, and a velocity of an autonomous vehicle.

8. At least one non-transitory computer readable storage medium comprising instructions encoded thereon that, when executed, cause one or more processors to at least:
perform beamforming on a plurality of acoustic signal spectra to generate at least a first beam signal spectrum in a first direction and a second beam signal spectrum in a second direction different from the first direction, the acoustic signal spectra generated from acoustic signals received from an array of microphones;
detect, by a deep neural network (DNN) classifier, an acoustic event associated with an acoustic source, in at least one of the first beam signal spectrum or the second beam signal spectrum;
estimate, by the deep neural network (DNN) classifier, a direction of the acoustic source of at least one of the first direction or the second direction;
perform:
first pattern extraction in response to the detection of the acoustic event, the first pattern extraction associated with a first power state of the one or more processors; and
second pattern extraction prior to the detection of the acoustic event, the second pattern extraction associated with a second power state of the one or more processors, the second power state consuming less power than the first power state, the pattern comprising identified time and frequency bins of the plurality of acoustic signal spectra, the bins associated with the acoustic event; and
estimate a direction of motion of the acoustic source relative to the array of microphones, the estimation based on a Doppler frequency shift of the acoustic event, the Doppler frequency shift calculated from the time and frequency bins of the extracted pattern.

9. The computer readable storage medium of claim 8, wherein the instructions cause the one or more processors to:
apply a Generalized Cross Correlation Phase Transform to the plurality of acoustic signal spectra to generate an angular spectrum; and
estimate a direction of the acoustic source relative to the array of microphones based on detection of a peak in the angular spectrum.

10. The computer readable storage medium of claim 8, wherein the instructions cause the one or more processors to compare one or more of the plurality of acoustic signal spectra to a predetermined spectrum associated with an expected pattern, and identify time and frequency bins that match, based on the comparison, to within a threshold value when performing the pattern extraction.

11. The computer readable storage medium of claim 8, wherein the instructions cause the one or more processors to apply a neural network to one or more of the plurality of acoustic signal spectra, the neural network trained to generate scores for time and frequency bins of the acoustic signal spectra that indicate a probability of matching to an acoustic event of interest, when performing the pattern extraction.

12. The computer readable storage medium of claim 8, wherein the acoustic source is an emergency vehicle and the acoustic event is a siren.

13. The computer readable storage medium of claim 8, wherein the instructions cause the one or more processors to apply a high-pass filter to the acoustic signal spectra to reduce wind noise.

14. A system for audio-based detection and tracking of an acoustic source, the system comprising:
a beamforming circuit to perform beamforming on a plurality of acoustic signal spectra to generate at least a first beam signal spectrum in a first direction and a second beam signal spectrum in a second direction different from the first direction, the acoustic signal spectra generated from acoustic signals received from an array of microphones;
a deep neural network (DNN) classifier to:
detect an acoustic event associated with the acoustic source, in at least one of the first beam signal spectrum or the second beam signal spectrum; and
estimate a direction of the acoustic source of at least one of the first direction or the second direction;
a pattern extraction circuit to perform:
first pattern extraction instructions in response to the detection of the acoustic event, the first pattern extraction instructions associated with a first power state of the pattern extraction circuit; and
second pattern extraction instructions prior to the detection of the acoustic event, the second pattern extraction instructions associated with a second power state of the pattern extraction circuit, the second power state consuming less power than the first power state, the pattern comprising identified time and frequency bins of the plurality of acoustic signal spectra, the bins associated with the acoustic event; and
a movement direction estimation circuit to estimate a direction of motion of the acoustic source relative to the array of microphones, the estimation based on a Doppler frequency shift of the acoustic event, the Doppler frequency shift calculated from the time and frequency bins of the extracted pattern.

15. The system of claim 14, further comprising a direction of arrival estimation circuit to:
- apply a Generalized Cross Correlation Phase Transform to the plurality of acoustic signal spectra to generate an angular spectrum; and
- estimate a direction of the acoustic source relative to the array of microphones based on detection of a peak in the angular spectrum.

16. The system of claim 14, wherein the pattern extraction circuit is further to compare one or more of the plurality of acoustic signal spectra to a predetermined spectrum associated with an expected pattern, and identify time and frequency bins that match, based on the comparison, to within a threshold value.

17. The system of claim 14, wherein the pattern extraction circuit further comprises a neural network for application to one or more of the plurality of acoustic signal spectra, the neural network trained to generate scores for time and frequency bins of the acoustic signal spectra that indicate a probability of matching to an acoustic event of interest.

18. The system of claim 14, wherein the acoustic source is an emergency vehicle and the acoustic event is a siren.

19. The system of claim 14, further comprising a signal conditioning circuit to apply a high-pass filter to the acoustic signal spectra to reduce wind noise.

20. The system of claim 14, wherein a magnitude of the direction of motion causes the acoustic source to undertake a safety related action, the safety related action including at least one of pulling over an autonomous vehicle on to a shoulder or stop the autonomous vehicle.

* * * * *